United States Patent
Ikeda et al.

(10) Patent No.: US 7,362,356 B2
(45) Date of Patent: Apr. 22, 2008

(54) WHITE BALANCE CORRECTION INCLUDING INDICATIVE WHITE COLOR DETERMINATION BASED ON REGIONS IN A DIVIDED IMAGE

(75) Inventors: Eiichiro Ikeda, Kanagawa (JP); Takaaki Fukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1102 days.

(21) Appl. No.: 10/368,956

(22) Filed: Feb. 19, 2003

(65) Prior Publication Data
US 2003/0156206 A1    Aug. 21, 2003

(30) Foreign Application Priority Data
Feb. 20, 2002    (JP)    .............................. 2002-043326

(51) Int. Cl.
H04N 9/73    (2006.01)
H04N 1/46    (2006.01)

(52) U.S. Cl. ................................ 348/223.1; 348/225.1; 358/516

(58) Field of Classification Search ............. 348/223.1, 348/224.1, 225.1, 226.1, 227.1, 228.1; 358/515–517; 382/164
See application file for complete search history.

(56) References Cited

U.S. PATENT DOCUMENTS

| | | | |
|---|---|---|---|
| 5,530,474 A | 6/1996 | Takei | 348/224 |
| 6,008,863 A * | 12/1999 | Jinnai | 348/655 |
| 6,727,942 B1 * | 4/2004 | Miyano | 348/223.1 |
| 6,788,339 B1 | 9/2004 | Ikeda | 348/223.1 |
| 6,906,744 B1 * | 6/2005 | Hoshuyama et al. | 348/223.1 |
| 7,148,921 B2 * | 12/2006 | Ikeda et al. | 348/223.1 |
| 2002/0122120 A1 * | 9/2002 | Hsieh | 348/231 |

FOREIGN PATENT DOCUMENTS

| | | |
|---|---|---|
| EP | 0 738 085 A2 | 10/1996 |
| JP | 5-292533 | 11/1993 |
| JP | 11-262029 | 9/1999 |
| JP | 2000-92509 | 3/2000 |

OTHER PUBLICATIONS

European Search Report dated Nov. 16, 2004.

* cited by examiner

Primary Examiner—Lin Ye
Assistant Examiner—Kelly Jerabek
(74) Attorney, Agent, or Firm—Morgan & Finnegan, L.L.P.

(57) ABSTRACT

An entered image is divided into a plurality of blocks and it is determined, on a per-block basis, whether image data within an applicable block is indicative of the color white, based upon a condition, from among a plurality of conditions, that conforms to the position of each block in the image. A white balance correction is performed based upon data of a block determined to be indicative of the color white.

17 Claims, 16 Drawing Sheets

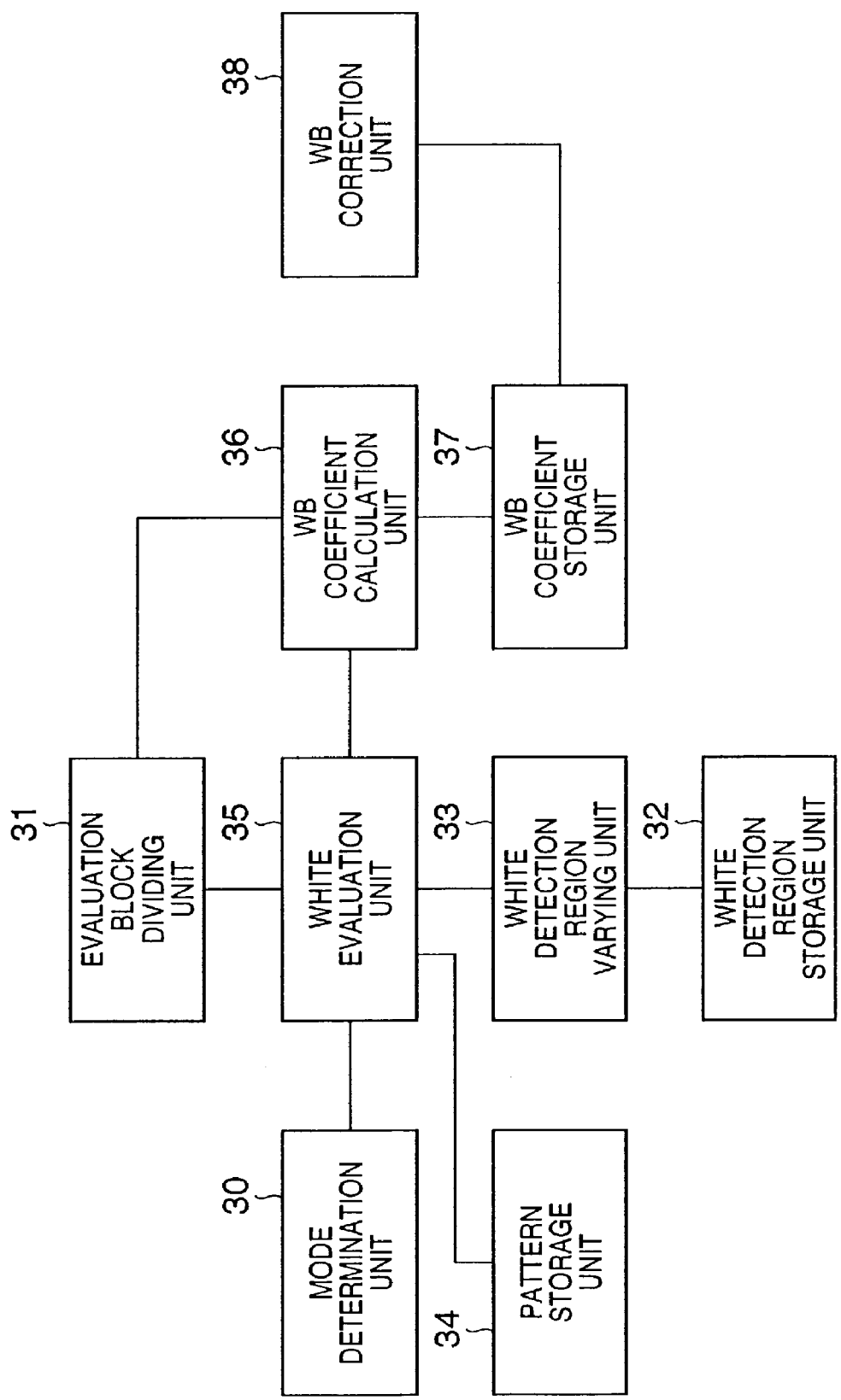

HIGH COLOR TEMPERATURE    LOW COLOR TEMPERATURE

HIGH COLOR TEMPERATURE    LOW COLOR TEMPERATURE

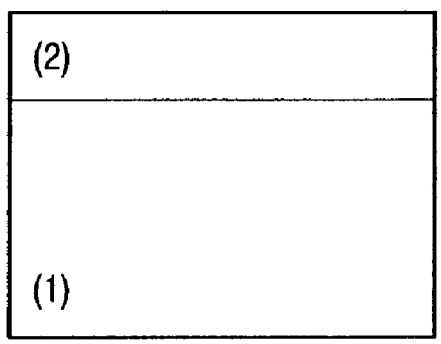 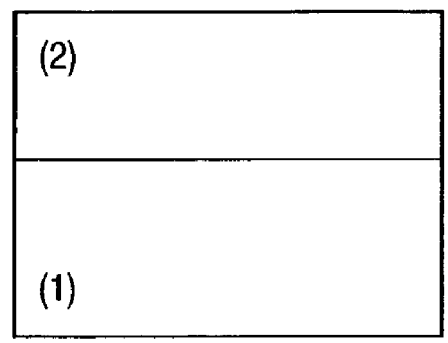
F I G. 6A    F I G. 6B

HIGH COLOR TEMPERATURE     LOW COLOR TEMPERATURE

HIGH COLOR TEMPERATURE     LOW COLOR TEMPERATURE

HIGH COLOR TEMPERATURE ← → LOW COLOR TEMPERATURE

HIGH COLOR TEMPERATURE ← → LOW COLOR TEMPERATURE

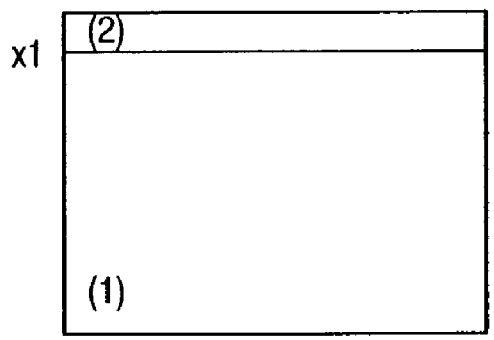
Bv1 SMALL
F I G. 16A
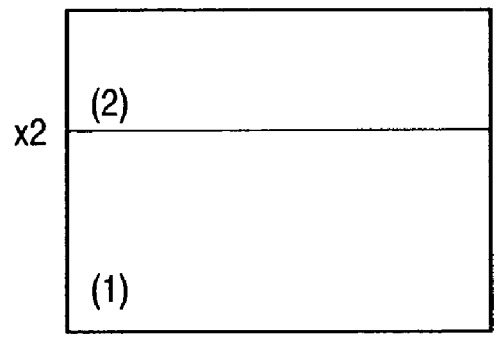
Bv2 LARGE
F I G. 16B
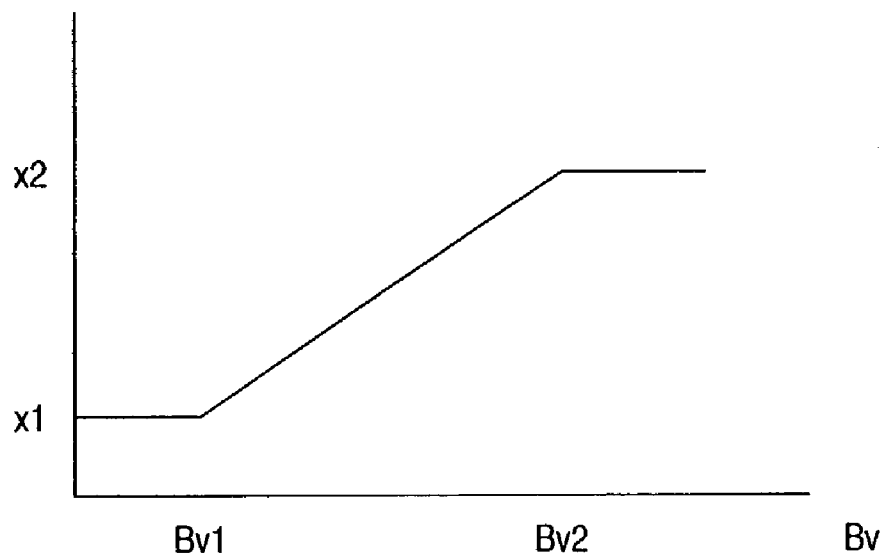
F I G. 16C

WHITE BALANCE CORRECTION INCLUDING INDICATIVE WHITE COLOR DETERMINATION BASED ON REGIONS IN A DIVIDED IMAGE

FIELD OF THE INVENTION

This invention relates to a white balance correction apparatus and method. More particularly, the invention relates to a white balance correction apparatus and method used in a device such as a digital camera or digital video camera.

BACKGROUND OF THE INVENTION

FIG. 13 is a block diagram illustrating the structure of a single CCD type digital camera as one example of a conventional image sensing apparatus according. In FIG. 13, a solid-state image sensing device 1 such as a CCD has its surface covered by an RGB color filter of, e.g., a Bayer-type array, which enables color image sensing. The optical image of an object that impinges upon the image sensing device 1 via a lens (not shown) is converted to an electric signal by the image sensing device 1. In order to eliminate noise from the electric signal obtained by the conversion, the signal is processed by a CDS/AGC circuit 2, after which a conversion is made to a digital signal by an A/D converter circuit 3 pixel by pixel in successive fashion.

The digital signal that is output from the A/D converter circuit 3 has its white gain adjusted by a white balance circuit 4, whence the resulting signal is sent to a luminance notch circuit 12. The luminance notch circuit 12 uses a vertical low-pass filter (VLPF) to execute processing for reducing signal gain of a frequency in the vicinity of the Nyquist frequency in the vertical direction. Gain reduction processing by a horizontal low-pass filter (HLPF) is executed similarly in the horizontal direction. Such a filter shall be referred to as a "luminance notch filter" below. Next, a horizontal band-pass filter (HBPF) circuit 13 and vertical band-pass filter (VBPF) circuit 16 raise the frequency, which is slightly lower than the Nyquist frequency weakened by the notch filters.

Amplitude is adjusted subsequently by PP (aperture peak) gain circuits 14 and 17 in both the horizontal and vertical directions, and then low amplitude is cut, thereby eliminating noise, by base clipping (BC) circuits 15 and 18. The horizontal and vertical components are subsequently added by an adder 19, main gain is applied by an APC (Aperture Control) main gain circuit 20, and the resultant signal is added to a baseband signal by an adder 21. A gamma conversion circuit 22 then performs a gamma conversion and a luminance correction (YCOMP) circuit 23 executes a luminance-signal level correction based upon color.

Next, as an example of color signal processing, a color interpolation circuit 5 executes an interpolation with regard to all pixels in such a manner that all color pixel values will be present, and a color conversion matrix (MTX) circuit 6 converts each of the color signals to a luminance signal (Y) and color difference signals (Cr, Cb). Color-difference gain of low- and high-luminance regions is then suppressed by a chroma suppression (CSUP) circuit 7, and band is limited by a chroma low-pass filter (CLPF) circuit 8. The band-limited chroma signal is converted to an RGB signal and is simultaneously subjected to a gamma conversion by a gamma conversion circuit 9. The RGB signal resulting from the gamma conversion is again converted to Y, Cr, Cb signals, gain is adjusted again by a chroma gain knee (CGain Knee) circuit 10, and a linear clip matrix (LCMTX) circuit 11 makes a minor correction of hue and corrects a shift in hue caused by individual differences between image sensing devices.

Processing executed by the white balance circuit 4 in the image sensing apparatus of FIG. 13 will now be described. The image signal output from the image sensing device 1 and converted to a digital signal by the A/D converter circuit 3 is divided into a plurality (any number of) blocks of the kind shown in FIG. 14, and color evaluation values Cx, Cy, Y are calculated for each block based upon the following equations:

$$Cx=(R-B)/Y$$

$$Cy=(R+B-2G)/Y$$

$$Y=(R+G+B)/2 \qquad (1)$$

The color evaluation values Cx, Cy of each block calculated in accordance with Equations (1) are compared with a previously set white detection region (described later). If the evaluation values fall within the white detection region, it is assumed that the block is white and then the summation values (SumR, SumG, SumB) of respective ones of the color pixels of the blocks assumed to be white are calculated. White balance gains kWB_R, kWB_G, kWB_B for each of the colors RGB are then calculated from the summation values using the following equations:

$$kWB\_R=1.0/SumR$$

$$kWB\_G=1.0/SumG$$

$$kWB\_B=1.0/SumB \qquad (2)$$

The white balance circuit 4 performs the white balance correction using the white balance gains thus obtained.

FIGS. 15A and 15B are graphs illustrating a white detection region 101. In order to obtain the white detection region 101, a white object such as a standard white sheet (not shown) is sensed from high to low color temperatures using light sources at arbitrary color temperature intervals, and the color evaluation values Cx, Cy are calculated based upon Equations (1) using the signal values obtained from the image sensing device 1. Next, Cx and Cy obtained with regard to each of the light sources are plotted along the X axis and Y axis, respectively, and the plotted points are connected by straight lines. Alternatively, plotted points are approximated using a plurality of straight lines. As a result, a white detection axis 102 from high to low color temperatures is produced. In actuality, there are slight variations in spectral diffraction even for the color white. For this reason, the white detection axis 102 is provided with some width along the direction of the Y axis. This region is defined as the white detection region 101.

The conventional white balance detection apparatus, however, has certain drawbacks. For example, consider a case where a close-up of the human face is taken in the presence of a light source such as sunlight having a high color temperature. Though the color evaluation values of a white subject in the presence of sunlight are distributed as indicated by area 103 in FIG. 15A, the color evaluation values of the human complexion are distributed as indicated by area 105 in FIG. 15A. These values are distributed in an area substantially the same as that (the area indicated at 104 in FIG. 15A) of color evaluation values of the color white photographed in the presence of a light source such as white tungsten having a low color temperature.

Further, the color evaluation values are distributed as indicated in area 106 in FIG. 15B in a case where an area (on the order of 7000 K) in which the blue of the sky has grown pale, as at the horizon or at the boundaries of clouds, is included in a scene in, say, a scenery mode. This substantially coincides with the distribution of evaluation values (area 107 in FIG. 15B) of the color white sensed under cloudy conditions or in the shade. As a consequence, the color temperature of the scene is judged to be higher than it actually is (color temperature under clear skies is on the order of 5500 K) and the pale blue of the sky is corrected to white. This represents a judgment error.

SUMMARY OF THE INVENTION

The present invention has been made in consideration of the above situation and has as its object to reduce erroneous decisions regarding white evaluation, thereby performing a better white balance correction.

According to the present invention, the foregoing object is attained by providing a white balance correction apparatus comprising; a dividing unit adapted to divide an image into a plurality of areas; a white evaluation unit adapted to determine whether image data within every divided area is indicative of the color white according to the position of each divided area in the image; and a white balance correction unit adapted to perform a white balance correction based upon image data determined to be indicative of the color white.

According to the present invention, the foregoing object is also attained by providing a white balance correction method comprising; dividing an image into a plurality of areas; determining whether image data within every divided area is indicative of the color white according to the position of each divided area in the image; and performing a white balance correction based upon image data determined to be indicative of the color white.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 1 is a block diagram illustrating a structure of a white balance correction apparatus according to a first embodiment of the present invention;

FIGS. 6A and 6B are diagrams illustrating the division of a screen in a first modification of the invention;

FIGS. 16A to 16C are diagrams illustrating examples of detection patterns for detecting a white region on a screen conforming to brightness of an object in the first modification of the present invention.

DETAILED DESCRIPTION OF THE PREFERRED EMBODIMENTS

Preferred embodiments of the present invention will be described in detail in accordance with the accompanying drawings.

First Embodiment

Figure 13:
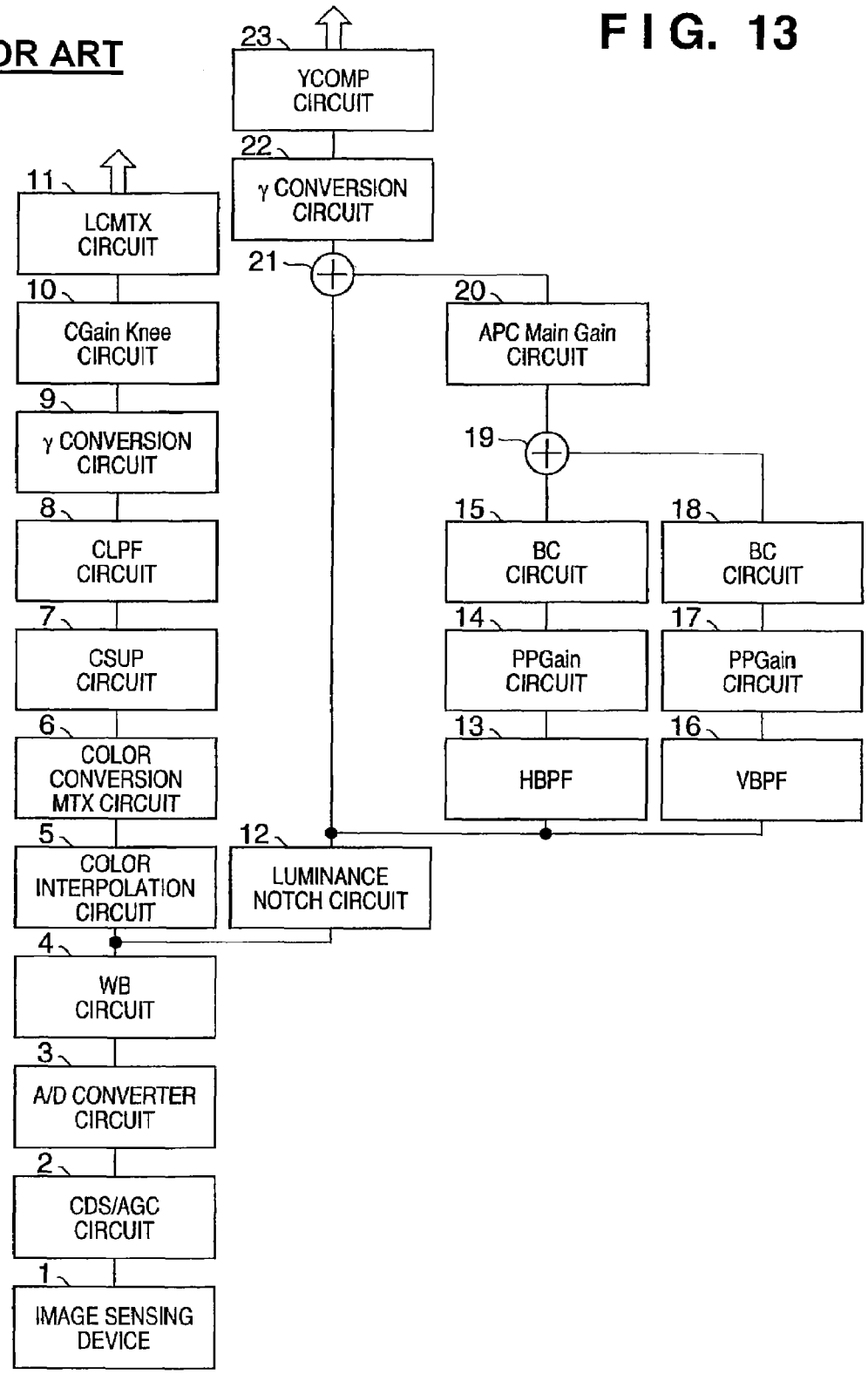
FIG. 13 is a block diagram illustrating the structure of a conventional image sensing apparatus.

FIG. 1 is a block diagram illustrating the structure of a white balance correction apparatus according to a first embodiment of the present invention. The white balance correction apparatus according to this embodiment is capable of being used instead of the white balance circuit 4 shown in FIG. 13, by way of example. The components of the image sensing apparatus with the exception of the white balance circuit 4 will be described below with reference to FIG. 13.

Figure 14:
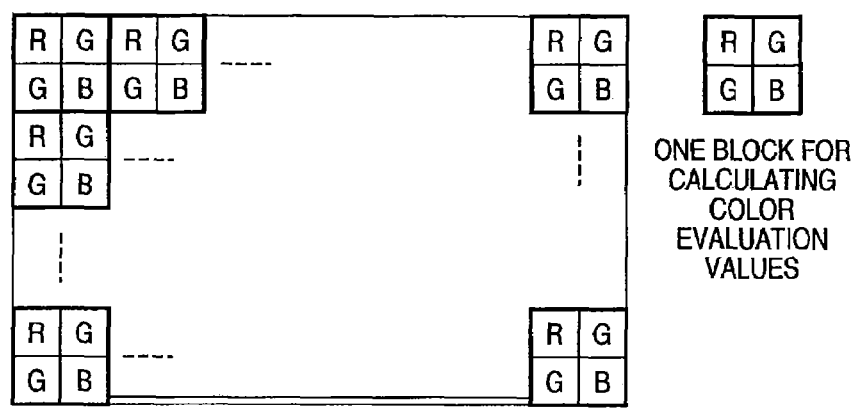
FIG. 14 is a diagram illustrating division of a screen indicating units for performing white evaluation.
Figure 15A:
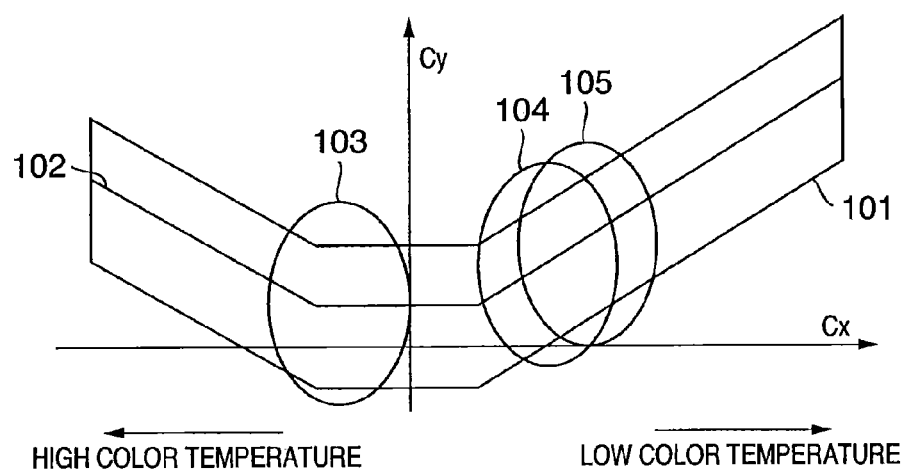
FIGS. 15A and 15B are diagrams illustrating a conventional white detection region.
Figure 15B:
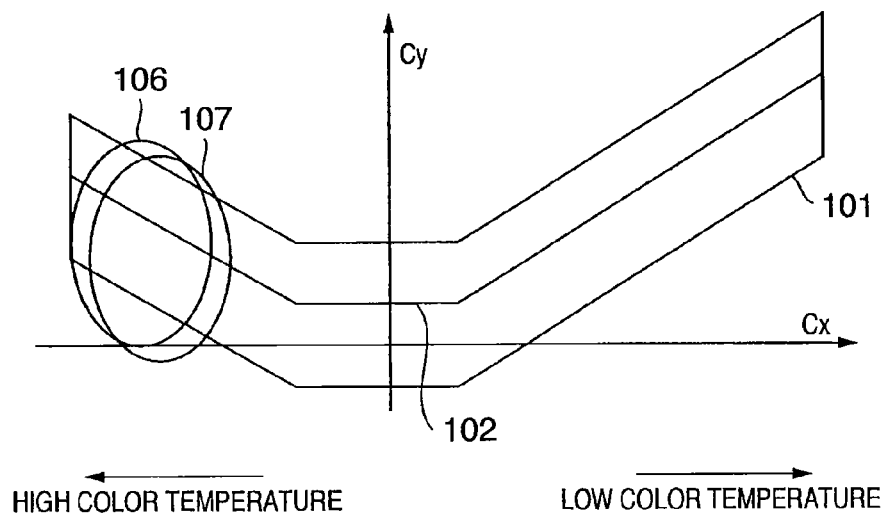

As shown in FIG. 1, the white balance correction apparatus includes a mode determination unit 30 for determining the operating mode of the image sensing apparatus (modes such as an automatic mode, portrait mode for sensing a person or persons, scenery mode for sensing scenery and manual mode for allowing the user to set a white balance correction value); an evaluation block dividing unit 31 for dividing the output signal of the image sensing device 1 into a plurality of evaluation blocks of the kind shown in FIG. 14; a white detection region storage unit 32 for storing a white detection region (referred to as a "standard white correction region" below) serving as a standard; a white detection region varying unit 33 for changing the white detection region when appropriate using limit values; a pattern storage unit 34 for storing, classified by mode, patterns which are combinations of position on the screen and a white decision region that has been changed by the white detection region varying unit 33 used in order to subject the evaluation block at this position to white evaluation; a white evaluation unit 35 for determining whether each evaluation block obtained by division by the evaluation block dividing unit 31 is white or not; a WB coefficient calculation unit 36 for calculating white balance (WB) coefficients, which are used in a WB correction, from signal values of evaluation blocks judged to be white by the white evaluation unit 35; a WB coefficient storage unit 37 for storing WB coefficients obtained by the WB coefficient calculation unit 36; and a WB correction unit 38 for applying a WB correction to the output signal of the image sensing device 1 using the WB coefficients stored in the WB coefficient storage unit 37. It should be noted that the white detection region storage unit 32, pattern storage unit 34 and WB coefficient storage unit 37 may be implemented by a single memory or by a plurality of memories.

The reference white detection region stored in the white detection region storage unit 32 will now be described. The description will relate to a case where a primary-color filter is used as the image sensing device 1.

Figure 2A:
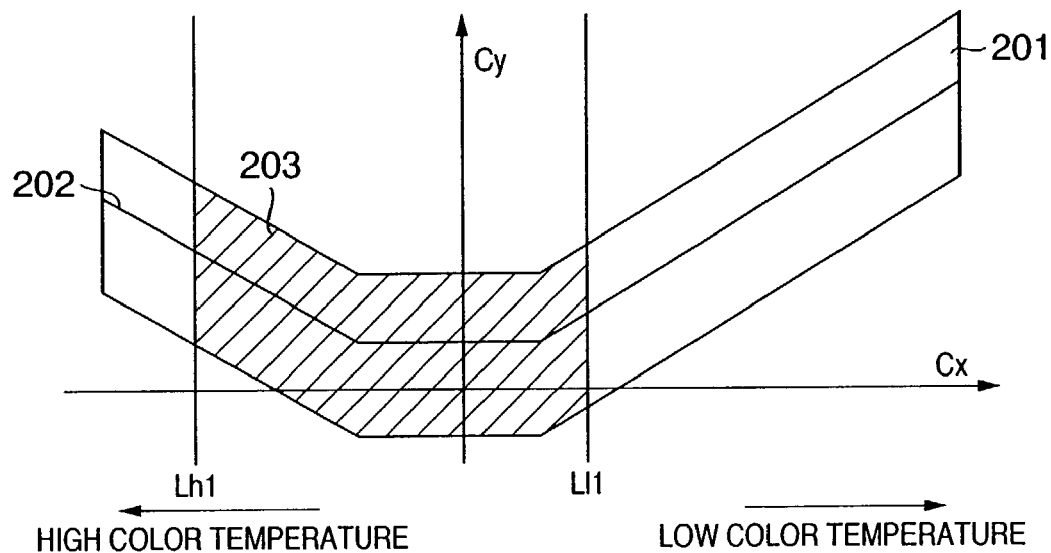
FIGS. 2A and 2B are diagrams illustrating white detection regions according to the first embodiment of the present invention.
Figure 2B:
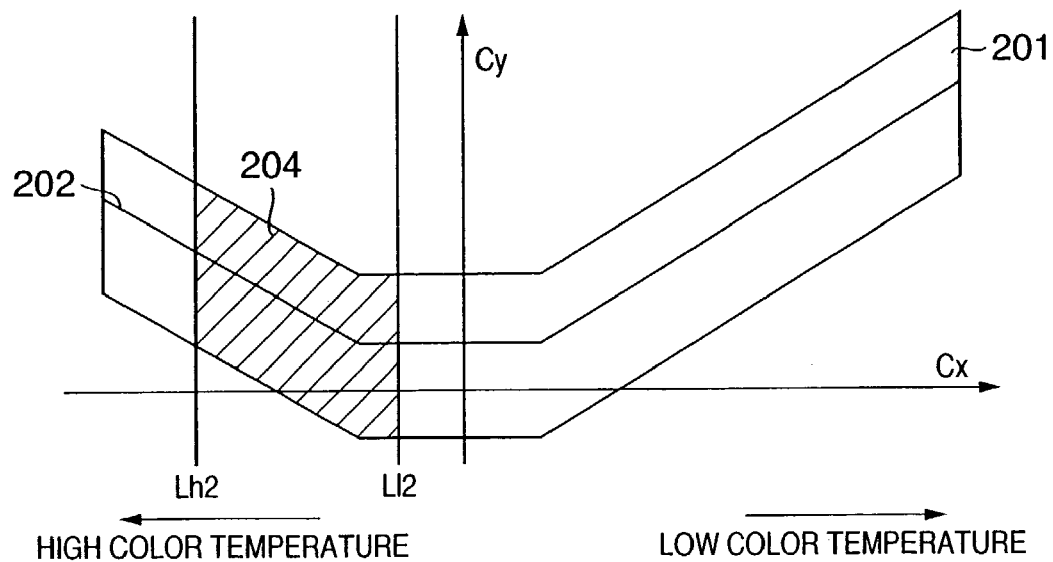

In FIGS. 2A and 2B, reference numerals 201 and 202 denote a white detection region and a white detection axis, respectively. As in the example of the prior art, a white object such as a standard white sheet (not shown) is sensed from high to low color temperatures using light sources at arbitrary color temperature intervals, and the color evaluation values Cx, Cy are calculated based upon Equations (1) using the signal values obtained from the image sensing device 1. Next, Cx and Cy obtained with regard to each of the light sources are plotted along the X axis and Y axis, respectively, and the plotted points are connected by straight lines or the plotted points are approximated by a plurality of straight lines. As a result, the white detection axis 202 from high to low color temperatures is produced. It should be noted that the X axis corresponds to the color temperature of the light source and the Y axis corresponds to the amount of correction in the green direction (that is, the color-temperature direction of luminance and the color-temperature direction of fluorescent light). In actuality, there are slight variations in spectral diffraction even for the color white. For this reason, the white detection axis is provided with some width along the direction of the Y axis. This region is defined as the white detection region 201. The data of the white detection region thus defined is stored in the white detection region storage unit 32 when the white balance correction apparatus is manufactured or shipped.

Conventionally, the evaluation block dividing unit 31 divides the output signal of the image sensing device 1 into a plurality of evaluation blocks of the kind shown in FIG. 14, and the white evaluation unit 35 calculates the color evaluation values Cx, Cy block by block using the Equations (1) and determines that a block is white if the calculated color evaluation values Cx, Cy fall within the white detection region 201. According to a characterizing feature of the first embodiment of the present invention, however, the size (limits along the direction of color temperature in an example shown in FIGS. 2A and 2B) of the white detection region 201 can be changed by the white detection region varying unit 33 in accordance with relative position of the evaluation block on the screen.

In FIG. 2A, a white detection region 203 is obtained by setting white detection limits Ll1, Lh1 with respect to the white detection region 201, thereby applying limits in such a manner that the range of Cx is made Ll1 to Lh1. A white detection region 204 in FIG. 2B is obtained by setting white detection limits Ll2, Lh2 with respect to the white detection region 201, thereby applying limits that make the range of Cx equal to Ll2 to Lh2 of the white detection region 204 so as to cut the low region of color temperatures from the white detection region 203.

The white evaluation unit 35 subjects the evaluation blocks to a white evaluation and the WB coefficient calculation unit 36 calculates the WB coefficients (white balance gains) from the summed values of the pixel values in evaluation blocks determined to be white and stores these coefficients in the WB coefficient storage unit 37. The WB correction unit 38 subjects the input image to a WB correction using the coefficients stored in the WB coefficient storage unit 37.

White evaluation processing will now be described with reference to FIGS. 2A to 4B.

Figure 3A:
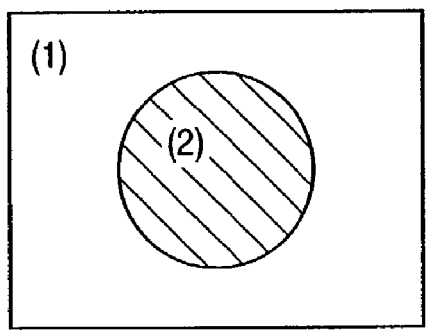
FIGS. 3A and 3B are diagrams illustrating the division of a screen in the first embodiment of the present invention.
Figure 3B:
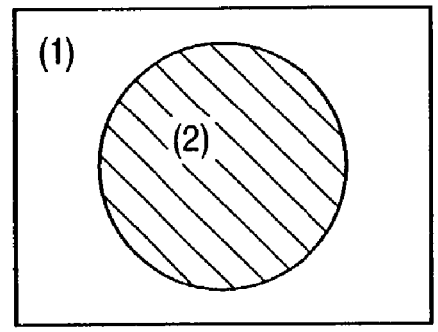

FIG. 3A illustrates a pattern setting example of a pattern stored in the pattern storage unit 34 in the automatic mode, and FIG. 3B illustrates a pattern setting example of a pattern stored in the pattern storage unit 34 in the portrait mode. Each pattern indicates a combination of the position of each evaluation block and the size of the changed white detection region used when subjecting the evaluation block at this position to white evaluation. It may be so arranged that even though the patterns are stored beforehand at the time of manufacture or shipping of the white balance correction apparatus, the user can alter the region settings.

Figure 4:
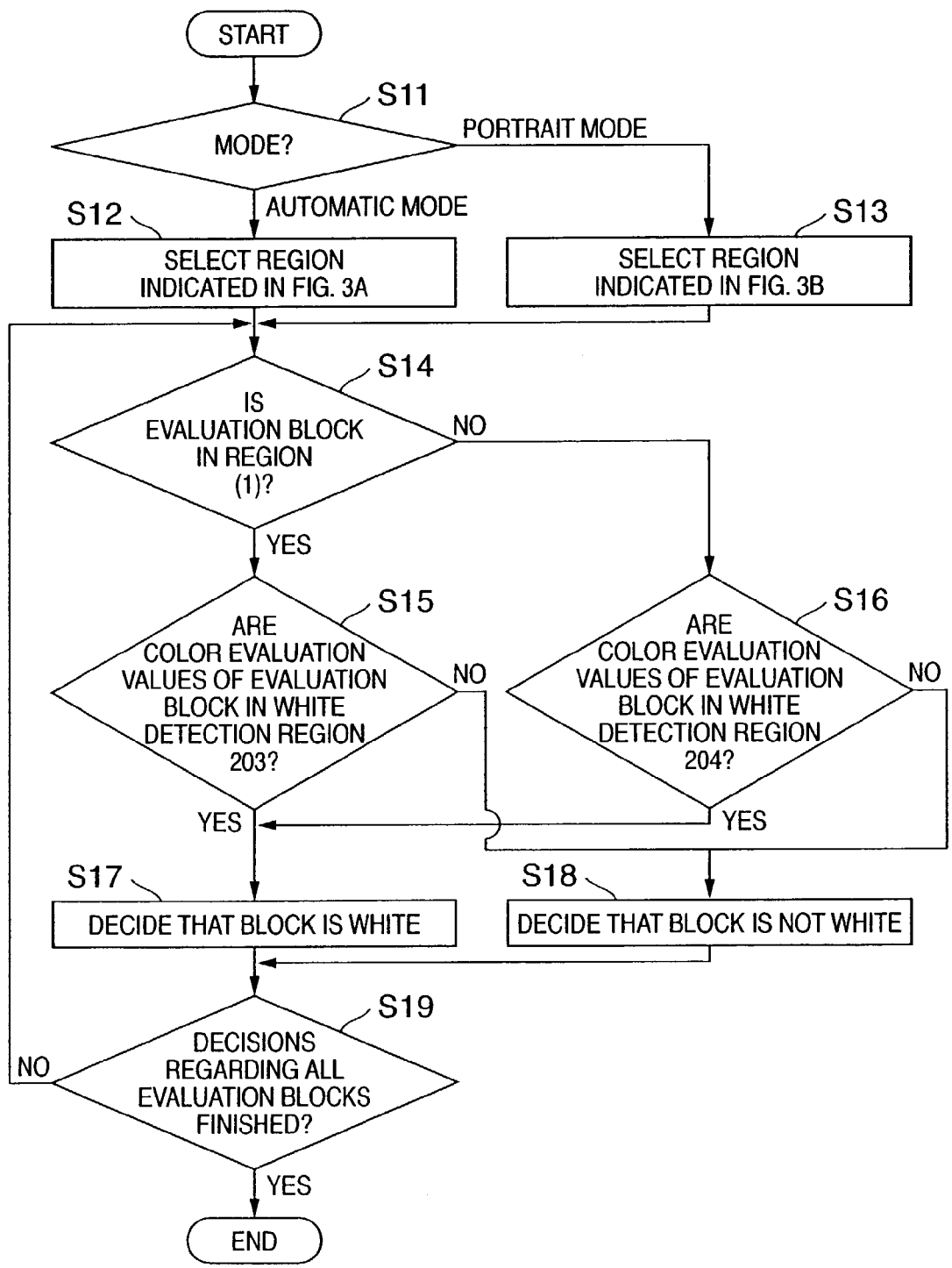
FIG. 4 is a flowchart illustrating white evaluation processing according to the first embodiment of the present invention.

First, at step S11 in FIG. 4, the mode determination unit 30 determines whether the automatic mode or the portrait mode has been set. If the automatic mode has been set, control proceeds to step S12, at which the white evaluation unit 35 acquires the region data of the pattern shown in FIG. 3A from the pattern storage unit 34. If the portrait mode has been set, control proceeds to step S13, at which the white evaluation unit 35 acquires the region data of the pattern shown in FIG. 3B from the pattern storage unit 34.

Next, at step S14, the white evaluation unit 35 determines whether each evaluation block is in region (1) or region (2). If it is in region (1) ("YES" at step S14), control proceeds to step S15, at which the color evaluation values of the evaluation block are compared with the white detection region 203, which is shown in FIG. 2A, limited by the white detection region varying unit 33.

If the evaluation block is in region (2) ("NO" at step S14), control proceeds to step S16, at which the color evaluation values of the evaluation block are compared with the white detection region 204, which is shown in FIG. 2B, limited by the white detection region varying unit 33. There is a high likelihood that a human face will be included in the central area of the screen. Accordingly, the limitation on the side of low color temperature is set to be higher for the central area than for the periphery of the screen, thereby applying a limitation to the white detection region 204 in such a manner that a complexion tone will not be evaluated incorrectly as being white.

If the color evaluation values of an evaluation block are found to fall within the white detection region 203 or 204 at either step S15 or S16, then control proceeds to step S17, at which the white evaluation unit 35 decides that this evaluation block is white. If the color evaluation values of an evaluation block are found not to fall within the white detection region 203 or 204, then control proceeds to step S18, at which the white evaluation unit 35 decides that this evaluation block is not white.

An evaluation block thus determined to be white has its pixel values summed in order to calculate the white gains (WB coefficients), as described above.

Whether the decision as to whether an evaluation block is white has been rendered with regard to all evaluation blocks is determined at step S19. Steps S14 to S18 are repeated until all of the evaluation blocks have been evaluated.

Experiments have shown that excellent results can be obtained if the white detection limit Ll2 on the side of low color temperature is fixed at about 5000 K. However, it goes without saying that the present invention is not limited to 5000 K and that this can be changed as appropriate.

In accordance with the first embodiment, as described above, erroneous decisions regarding white evaluation can be reduced by using a white detection region that differs depending upon position on the screen. As a result, it is possible to perform a better white balance correction.

Further, by enlarging the area of the central region (2), as shown in FIG. 3B, in a case where the image sensing mode of the camera is made the portrait mode, erroneous decisions regarding white evaluation ascribable to complexion can be reduced.

However, though it may be considered that there is a high likelihood that complexion will be present at the central part of the screen if the mode is the portrait mode, it may also be considered that there are many instances where complexion is not present at the central part of the screen if the mode is the automatic mode. If the above-described setting of the screen and setting of white limits is made in a case where completion is not present at the central part of the screen, the result of color-temperature detection at the center of the screen will not fall below the white detection limit Ll2 (e.g., 5000 K) on the side of low color temperature. A problem that arises as a consequence is that the result of color temperature based upon an image captured under, e.g., the A light source will become higher than the actual light-source color temperature. Accordingly, a white balance correction of higher precision can be achieved by performing the determination regarding the absence or presence of complexion before the operation indicated at step S12 in FIG. 4 and performing the operations from step S12 onward if complexion is judged to be present. This operation will be described with reference to the flowchart of FIG. 5.

Evaluation blocks in which image data is determined to be white (these blocks shall be referred to as "white evaluation blocks" below) are detected at step S21 using the same white detection region (a region delimited by the white detection limits or a region in which the color-temperature region of complexion is contained in a white detection region that is not limited; e.g., either the white detection region 201 or 203) with regard to all evaluation blocks in the central portion of the screen [region (2) in FIG. 3A] and peripheral portion [region (1) in FIG. 3A], light-source color temperature CtAround is obtained at step S22 from data that is the result of summing and averaging the image data of the white evaluation blocks in the peripheral portion of the screen, and light-source color temperature CtCenter is obtained at step S23 from data that is the result of summing and averaging the image data of the white evaluation blocks in the central portion of the screen. It should be noted that the order of the processing steps S22 and S23 may be reversed or the processing of steps S22 and S23 may be executed in parallel.

Next, CtAround and CtCenter are compared at step S24. If the color temperature CtCenter obtained from the central portion of the screen is less than the color temperature CtAround obtained from the peripheral portion of the screen, then it is judged at step S25 that there is a high likelihood that complexion is present in the central portion of the screen. In other words, if CtCenter<CtAround holds, then the central portion of the screen is judged to contain complexion and the light-source color temperature is calculated at step S26 by performing the white evaluation in the automatic mode shown in FIGS. 2A to 4B.

On the other hand, if the color temperature CtCenter obtained from the central portion of the screen is substantially equal to or greater than the color temperature CtAround obtained from the peripheral portion of the screen, it is judged at step S27 that there is a high likelihood that complexion is not present at the central portion of the screen. In other words, if CtCenter≧CtAround holds, then it is judged that complexion is not present, all evaluation blocks are compared with a common white detection region (step S28), white evaluation blocks are detected and the light-source color temperature obtained is adopted.

Adding on the above processing makes it possible to reduce even further erroneous decisions regarding white evaluation and makes it possible to perform a better white balance correction.

If the manual mode is found to be in effect at the mode discrimination step S11, then, in a manner similar to that where absence of complexion is determined, all evaluation blocks are compared with a common white detection region, white evaluation blocks are detected and the light-source color temperature obtained from image data in the white evaluation blocks is adopted.

(First Modification)

FIGS. 6A and 6B illustrate pattern setting examples for suppressing erroneous decisions that blue sky is the color white. FIG. 6A illustrates an example of a pattern in the case of the automatic mode, and FIG. 6B illustrates an example of a pattern in the case of the scenery mode. In a manner similar to that of the first embodiment, whether an evaluation block is white or not is determined by comparing regions (1) and (2) with white detection regions limited using different white detection limits.

Color evaluation values of an evaluation block in an image region in which the sky appears close to thin clouds or the horizon have a distribution substantially the same as that of color evaluation values of white points in the shade, as mentioned earlier. Consequently, an evaluation block in a portion of an image that is the sky is judged erroneously to be white. In other words, the sky is judged erroneously to be white, which has a high color temperature. Accordingly, white evaluation is carried out using different white detection regions in the upper and lower parts of the screen, as shown in FIG. 6A, with a limitation being applied by the white detection region varying unit 33 using a different white detection limit on the side of high color temperature.

Figure 7A:
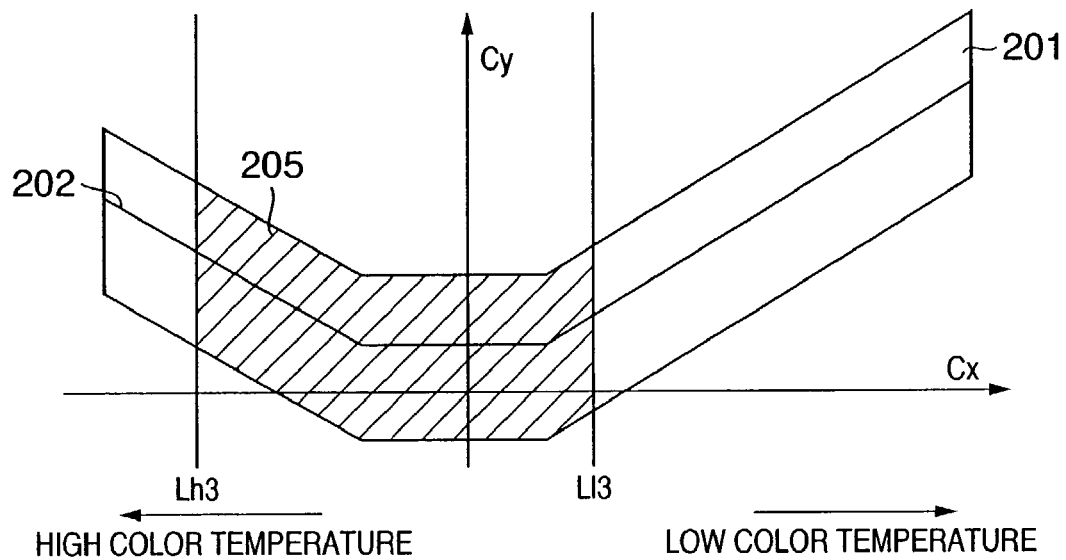
FIGS. 7A and 7B are diagrams illustrating white detection regions according to the first modification of the present invention.
Figure 7B:
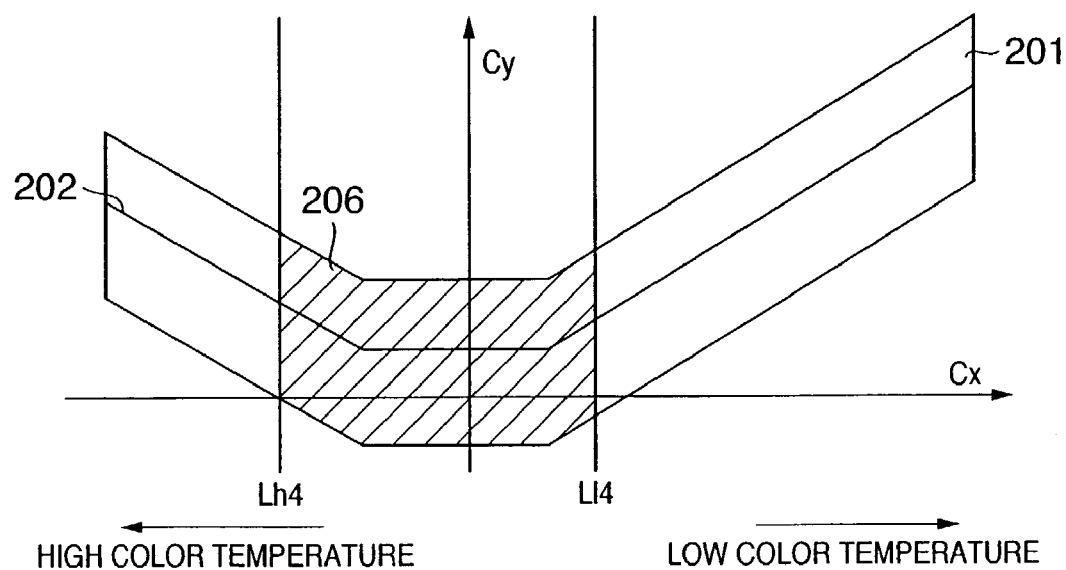

In the first modification, as shown in FIG. 7B, a white detection limit Lh4 on the side of high color temperature limiting the white detection region for the purpose of judging evaluation blocks at the upper portion of the screen is set to the side of low color temperature in comparison with a white detection limit Lh3 on the side of high color temperature shown in FIG. 7A for the purpose of judging evaluation blocks at the lower portion of the screen, thereby arranging is so that pale blue will not be judged erroneously as white.

Experiments have shown that excellent results can be obtained if the white detection limit Lh4 is fixed at about 5500 K. However, it goes without saying that the present invention is not limited to 5500 K and that this can be changed as appropriate.

In accordance with the first modification, as described above, erroneous decisions regarding white evaluation can be reduced by using a white detection region that differs depending upon position on the screen. As a result, it is possible to perform a better white balance correction.

Further, by enlarging the area of the upper region (2), as shown in FIG. 6B, in a case where the photographic mode of the camera is made the scenery mode, erroneous decisions regarding white evaluation at portions of blue sky can be reduced.

Figure 10A:
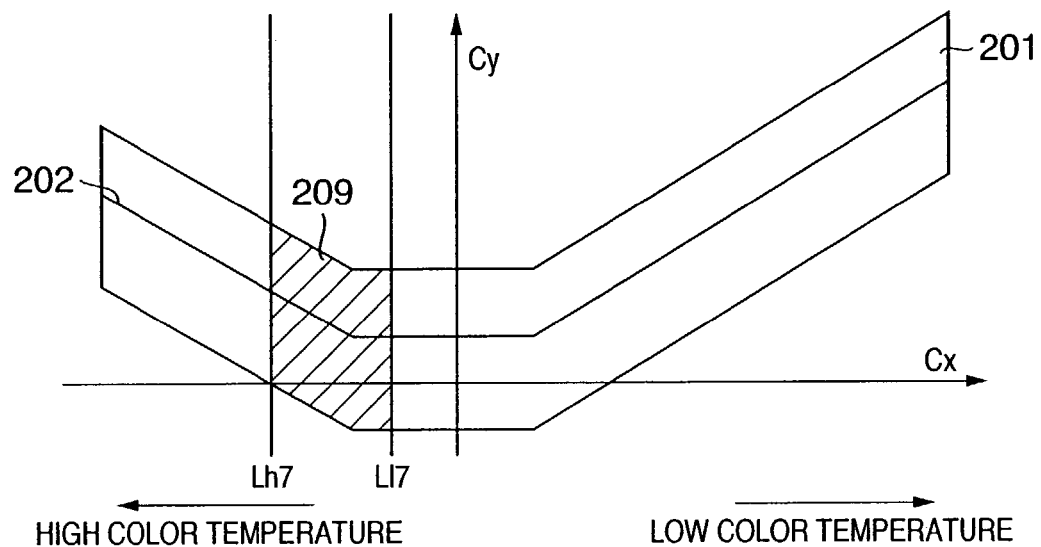
FIGS. 10A and 10B are diagrams illustrating white detection regions according to the second modification of the present invention.

In the first modification, brightness Bv of a subject may be detected from the captured image data and white detection patterns of the kind shown in FIGS. 6A and 6B may be changed in accordance with brightness. For example, when Bv is greater than a preset value Bv2, the probability that the image was captured outdoors is high (the percentage of area occupied by the sky is large). Accordingly, the proportion of evaluation blocks (2) in the upper part of the screen in which the white detection range is limited by a white detection region 209 shown in FIG. 10A is enlarged, as shown in FIG. 16B. On the other hand, when Bv is less than a preset value Bv1 (<Bv2), the probability that the image was captured indoors is high, and therefore the proportion of evaluation blocks (2) in the upper part of the screen is reduced, as shown in FIG. 16A. If the brightness of the subject is between Bv1 and Bv2, the proportion of evaluation blocks (2) in the upper part of the screen in which the white detection range is limited by the white detection region 209 is decided by linear calculation at Bv as indicated by the graph of FIG. 16C. An even more suitable white balance correction can be performed by executing such processing.

(Second Modification)

Figure 8:
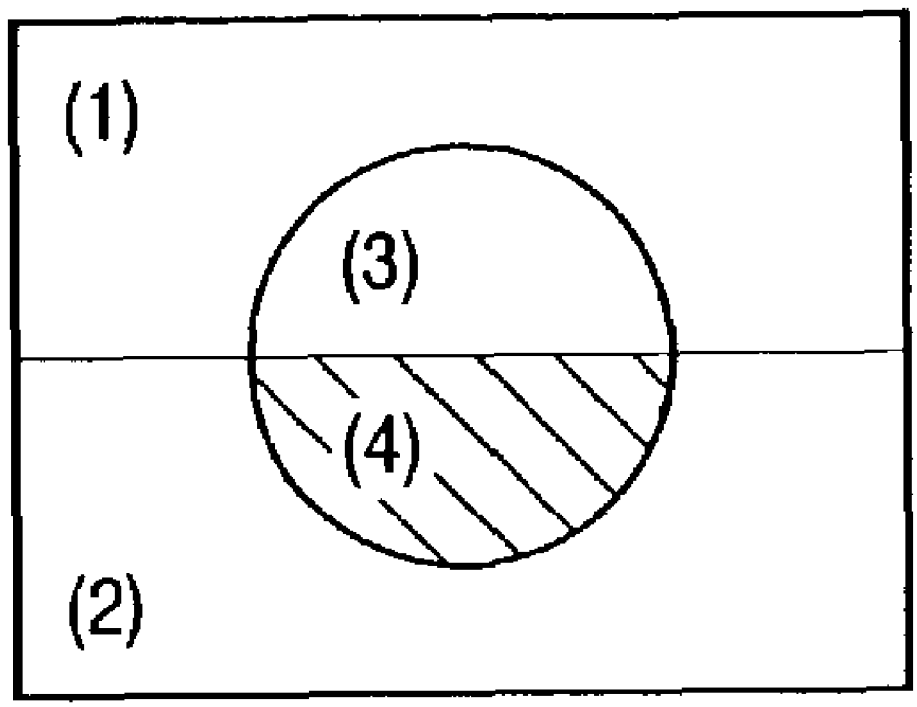
FIG. 8 is a diagram illustrating the division of a screen in a second modification of the invention.
Figure 9A:
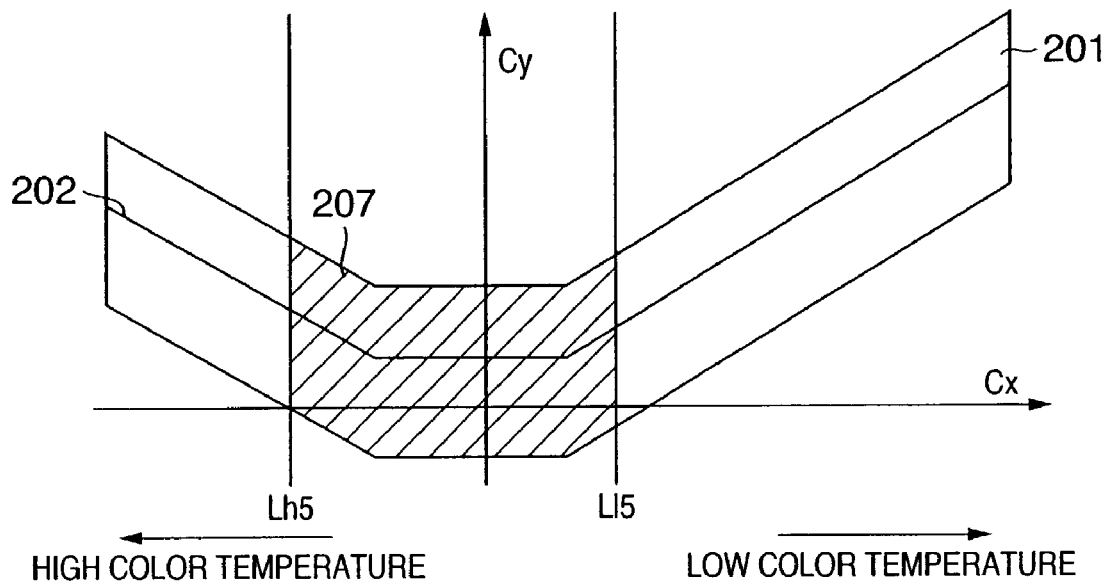
FIGS. 9A and 9B are diagrams illustrating white detection regions according to the second modification of the present invention.
Figure 9B:
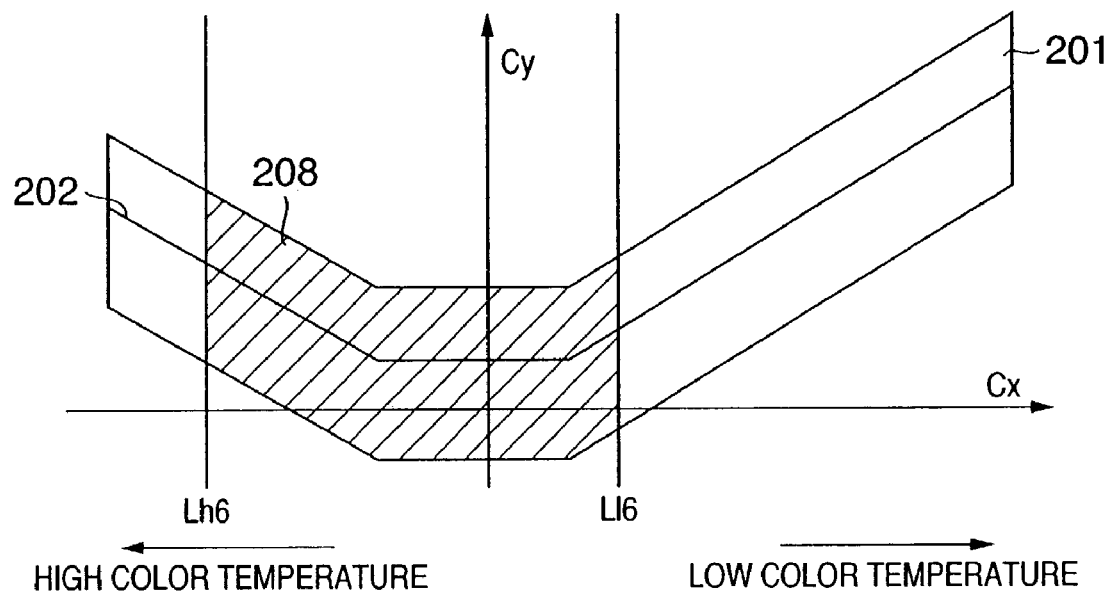
Figure 10B:
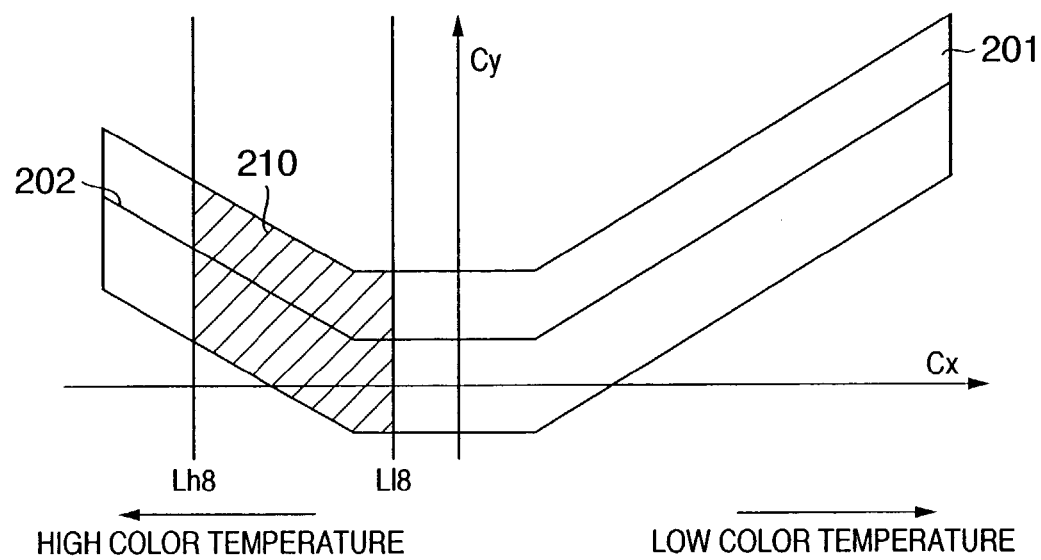

FIG. 8 illustrates an example of pattern setting for suppressing erroneous decisions relating to both complexion and the sky. Excellent results are obtained if, by way of example, the following settings are made for white evaluation of evaluation blocks in region (1) of FIG. 8:

white detection limit Lh5 on the side of high color temperature: 5500 K;

white detection limit Ll5 on the side of low color temperature: brightness variable (FIG. 9A);

the following settings are made with respect to the region (2) in FIG. 8:

white detection limit Lh6 on the side of high color temperature: brightness variable;

white detection limit Ll6 on the side of low color temperature: brightness variable (FIG. 9B);

the following settings are made with respect to the region (3) in FIG. 8:

white detection limit Lh7 on the side of high color temperature: 5500 K;

white detection limit Ll7 on the side of low color temperature: 5000 K (FIG. 10A); and the following settings are made with respect to the region (4) in FIG. 8:

white detection limit Lh8 on the side of high color temperature: brightness variable;

white detection limit Ll8 on the side of low color temperature: 5000 K (FIG. 10B).

It should be noted that the specific values indicated as the white detection limits Lh5, Lh7, Ll7 Ll8 are examples only. The present invention is not limited to these values and the values can be changes as appropriate.

In accordance with the second modification, as described above, use is made of patterns in which the area of the screen is more finely divided and white evaluation is performed using white detection regions that differ depending upon position on the screen. Accordingly, a white balance correction of even higher precision can be achieved.

It should be noted that the pattern used can be changed depending upon the image sensing mode in a manner similar to that of the first embodiment.

Second Embodiment

Figure 11:
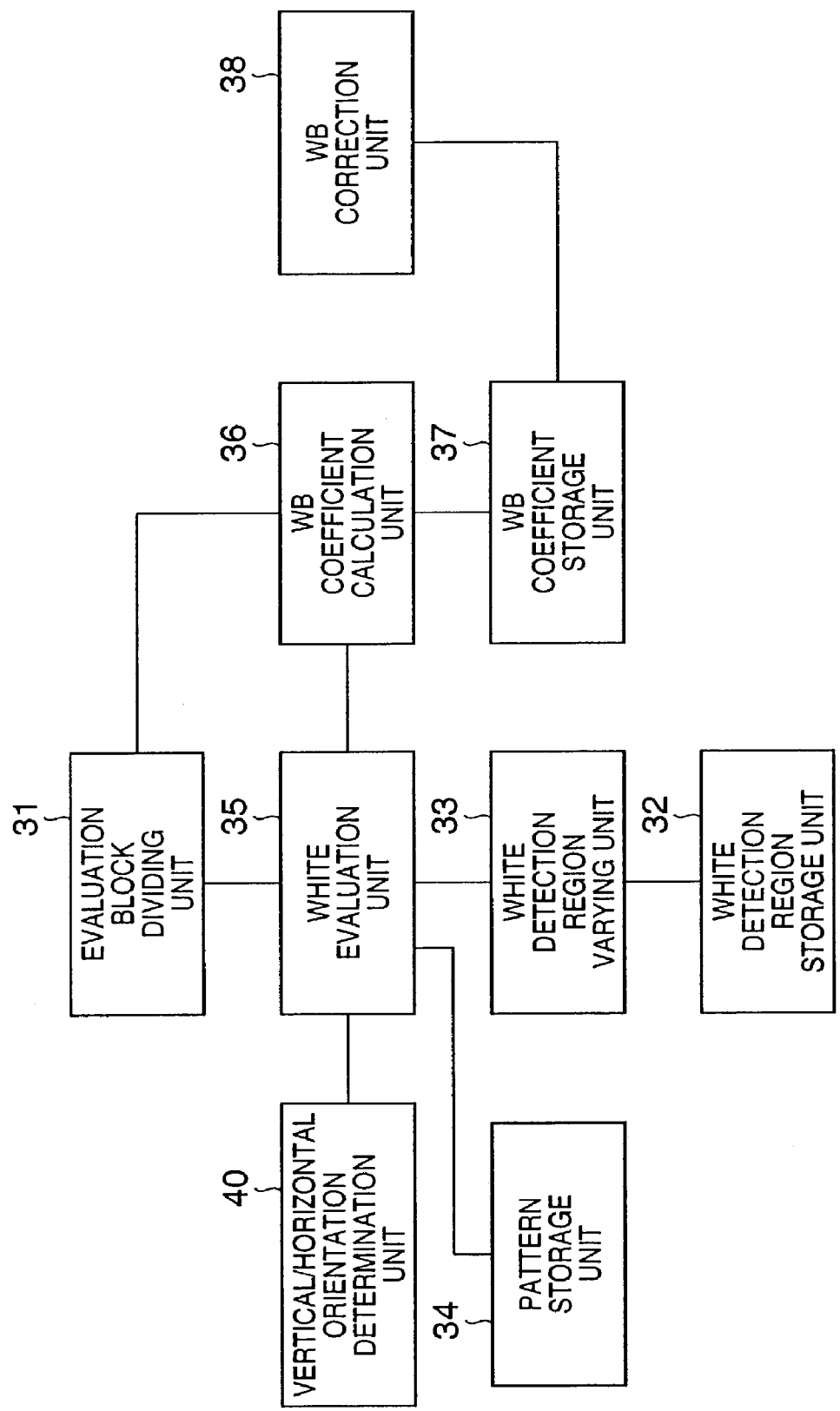
FIG. 11 is a block diagram illustrating the structure of a white balance correction apparatus according to the second embodiment of the present invention.

FIG. 11 is a block diagram illustrating the brief structure of a white balance correction apparatus according to a second embodiment of the present invention. This embodiment differs from that of FIG. 1 in that the mode determination unit 30 in FIG. 1 is replaced by a vertical/horizontal orientation determination unit 40 in FIG. 11 for discriminating horizontal and vertical orientations at the time of image sensing. Components in FIG. 11 identical with those shown in FIG. 1 are designated by like reference numerals, and explanation of them are omitted.

The characterizing feature of the second embodiment is that the vertical/horizontal orientation determination unit 40 discriminates horizontal and vertical orientations (rotation clockwise by 90° and rotation counter-clockwise by 90°) based upon the output of a gravity sensor (not shown) and makes it possible to change the setting of white detection limits depending upon the state of photography.

Figure 12A:
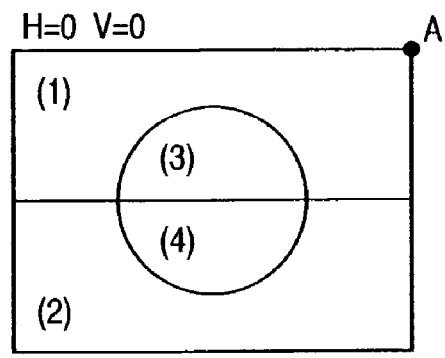
FIGS. 12A to 12C are diagrams illustrating the division of a screen according to the second embodiment of the present invention.
Figure 12B:
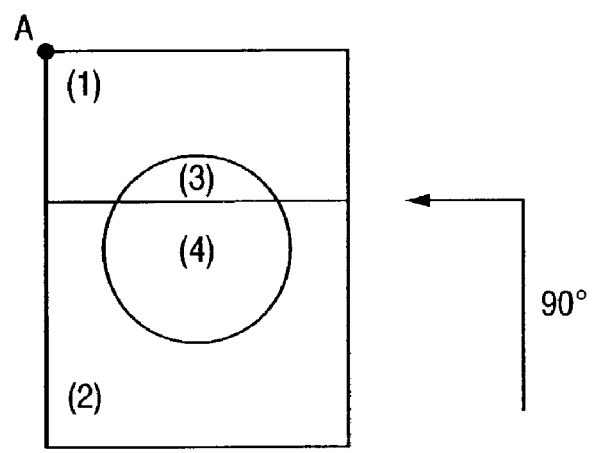
Figure 12C:
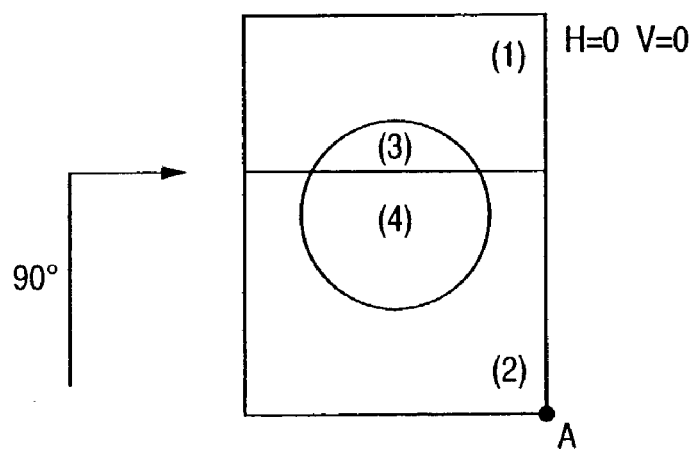

FIGS. 12A to 12C are diagrams illustrating pattern setting examples. FIG. 12A illustrates an example of a pattern in a case where horizontal orientation has been determined by the vertical/horizontal orientation determination unit 40, FIG. 12B an example of a pattern in a case where rotation counter-clockwise by 90° has been determined by the vertical/horizontal orientation determination unit 40, and FIG. 12C an example of a pattern in a case where rotation clockwise by 90° has been determined by the vertical/horizontal orientation determination unit 40. Point A in FIGS. 12A to 12C indicates the same corner and is shown in order to facilitate an understanding of direction of rotation.

The evaluation blocks in the regions (1) to (4) of FIGS. 12A to 13C are judged using, e.g., the white detection regions 207 to 210 shown in FIGS. 9A, 9B, 10A and 10B.

In accordance with the second embodiment, as described above, white evaluation of each evaluation block can be performed appropriately irrespective of camera orientation (horizontal or vertical) at the time of image sensing.

It should be noted that the pattern settings shown in FIGS. 12A to 12C are one example. It may be so arranged that the pattern settings shown in FIGS. 3A, 3B and FIGS. 6A, 6B or other settings may be used, and the settings may be changed depending upon the image sensing mode.

In the above embodiments, a case in which the white detection region is limited by the white detection region varying unit 33 has been described. However, it may be so arranged that a plurality of white detection regions are stored in advance and any of the stored white detection regions is used in dependence upon the position of the evaluation block.

Other Embodiments

Software and hardware implementations of the above embodiments can be substituted as appropriate.

Further, the above embodiments or the technical elements thereof may be combined as necessary.

Furthermore, even if all or part of the structure of the claims or of the embodiments forms a single apparatus, or even if a connection is made to an image sensing apparatus such as a digital camera or video camera or to another apparatus such as an image processing apparatus that processes signals obtained from an image sensing apparatus, the present invention may serve as an element that constructs such apparatus.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 5:
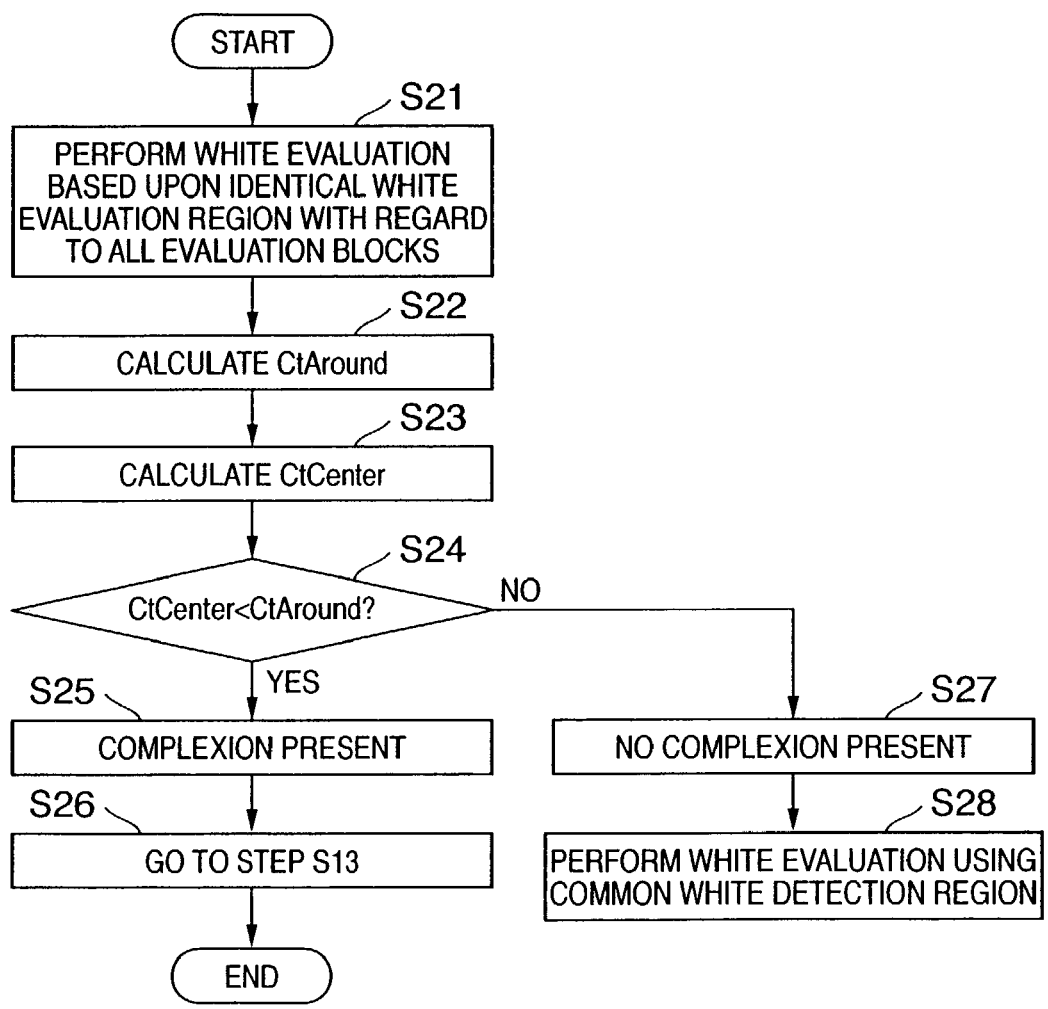
FIG. 5 is a flowchart illustrating processing for determining whether or not the color of complexion is present in an automatic mode according to the first embodiment of the present invention.

In a case where the present invention is applied to the aforesaid storage medium, the storage medium stores program codes corresponding to the flowcharts shown in FIG. 4 and/or FIG. 5 described in the embodiments.

The present invention is not limited to the above embodiments and various changes and modifications can be made within the spirit and scope of the present invention. Therefore to apprise the public of the scope of the present inventions the following claims are made.

What is claimed is:

1. A white balance correction apparatus, comprising:
   a dividing unit adapted to divide an image into a plurality of areas;
   a pattern storage unit adapted to store patterns indicating combinations of positions of each of the divided areas and conditions used, the patterns including a pattern that correlates the central portion of an image with a first condition and areas other than the central portion with a second condition;
   a white evaluation unit adapted to determine whether image data within every divided area is indicative of the color white according to the position of each divided area in the image, wherein white evaluation processing of all divided areas is executed using an identical condition, a first color temperature calculated from the central portion of the image and a second color temperature calculated from a peripheral portion of the image are compared, and said white evaluation unit is controlled so as to perform the white evaluation using an identical condition, irrespective of the position of a divided area in the image, if the first color temperature is equal to or higher than the second color temperature; and
   a white balance correction unit adapted to perform a white balance correction based upon image data determined to be indicative of the color white.

2. The apparatus according to claim 1, further comprising a calculation unit adapted to calculate a plurality of color evaluation values for every divided area.

3. An image sensing apparatus equipped with a white balance correction apparatus as set forth in claim 1.

4. The apparatus according to claim 3, further comprising an image sensing mode setting unit adapted to designate the image sensing mode.

5. A white balance correction apparatus, comprising:
   a dividing unit adapted to divide an image into a plurality of areas;
   a pattern storage unit adapted to store patterns indicating combinations of positions of each of the divided areas and conditions used, the patterns including a pattern that correlates the upper portion of an image with a third condition and areas other than the upper portion with a fourth condition, and wherein white evaluation processing of all divided areas is executed using an identical condition, a first color temperature calculated from the upper portion of the image and a second color temperature calculated from a lower portion of the image are compared, and said white evaluation unit is controlled so as to perform the white evaluation using an identical condition, irrespective of the position of a divided area in the image, if the second color temperature is equal to or higher than the first color temperature;
   a white evaluation unit adapted to determine whether image data within every divided area is indicative of the color white according to the position of each divided area in the image; and
   a white balance correction unit adapted to perform a white balance correction based upon image data determined to be indicative of the color white.

6. The apparatus according to claim 5, further comprising a calculation unit adapted to calculate a plurality of color evaluation values for every divided area.

7. An image sensing apparatus equipped with a white balance correction apparatus as set forth in claim 5.

8. The apparatus according to claim 7, further comprising an image sensing mode setting unit adapted to designate the image sensing mode.

9. A white balance correction apparatus, comprising:
   a dividing unit adapted to divide an image into a plurality of areas;
   a pattern storage unit adapted to store patterns indicating combinations of positions of each of the divided areas and conditions used, the patterns including a pattern that correlates the upper portion of an image with a third condition and areas other than the upper portion with a fourth condition, and wherein the patterns further include a pattern which, if the image sensing mode is a scenery mode, correlates the upper portion of the image to the third condition upon making the upper portion wider than when other modes are in effect;
   a white evaluation unit adapted to determine whether image data within every divided area is indicative of the color white according to the position of each divided area in the image; and
   a white balance correction unit adapted to perform a white balance correction based upon image data determined to be indicative of the color white.

10. The apparatus according to claim 9, further comprising a calculation unit adapted to calculate a plurality of color evaluation values for every divided area.

11. An image sensing apparatus equipped with a white balance correction apparatus as set forth in claim 9.

12. The apparatus according to claim 11, further comprising an image sensing mode setting unit adapted to designate the image sensing mode.

13. A white balance correction apparatus, comprising:
- a dividing unit adapted to divide an image into a plurality of areas;
- a pattern storage unit adapted to store patterns indicating combinations of positions of each of the divided areas and conditions used, wherein the patterns include a pattern that correlates the upper part of the central portion of an image with a fifth condition, the lower part of the central portion with a sixth condition, the upper part of areas other than the central portion with a seventh condition, and all other areas with an eighth condition;
- a white evaluation unit adapted to determine whether image data within every divided area is indicative of the color white according to the position of each divided area in the image; and
- a white balance correction unit adapted to perform a white balance correction based upon image data determined to be indicative of the color white.

14. The apparatus according to claim 13, wherein the conditions define discrimination of the color white in image data based upon a color-temperature region, limit values on the side of low color temperature of the fifth and sixth conditions are set to be higher than limit values on the side of low color temperature of the seventh and eighth conditions, a limit value on the side of high color temperature of the fifth condition is set to be lower than a limit value on the side of high color temperature of the sixth condition, and a limit value on the side of high color temperature of the seventh condition is set to be lower than a limit value on the side of high color temperature of the eighth condition.

15. The apparatus according to claim 13, further comprising a calculation unit adapted to calculate a plurality of color evaluation values for every divided area.

16. An image sensing apparatus equipped with a white balance correction apparatus as set forth in claim 13.

17. The apparatus according to claim 16, further comprising an image sensing mode setting unit adapted to designate the image sensing mode.

* * * * *